(12) United States Patent
Zhang

(10) Patent No.: US 8,638,578 B2
(45) Date of Patent: Jan. 28, 2014

(54) POWER CONVERTER INCLUDING A CHARGE PUMP EMPLOYABLE IN A POWER ADAPTER

(75) Inventor: Xiaoyang Zhang, Richardson, TX (US)

(73) Assignee: Power System Technologies, Ltd., Ebene (MU)

( * ) Notice: Subject to any disclaimer, the term of this patent is extended or adjusted under 35 U.S.C. 154(b) by 398 days.

(21) Appl. No.: 12/541,566

(22) Filed: Aug. 14, 2009

(65) Prior Publication Data

US 2011/0038179 A1    Feb. 17, 2011

(51) Int. Cl.
*H02M 3/06* (2006.01)

(52) U.S. Cl.
USPC ............................. 363/62; 323/228; 323/232

(58) Field of Classification Search
USPC ................. 363/62, 56.12; 323/229, 232, 352
See application file for complete search history.

(56) References Cited

U.S. PATENT DOCUMENTS

| | | | |
|---|---|---|---|
| 1,376,978 A | 5/1921 | Stoekle | |
| 2,473,662 A | 6/1949 | Pohm | |
| 3,007,060 A * | 10/1961 | Guenther | 327/172 |
| 3,346,798 A | 10/1967 | Dinger | |
| 3,358,210 A | 12/1967 | Grossoehme | |
| 3,433,998 A | 3/1969 | Woelber | |
| 3,484,562 A | 12/1969 | Kronfeld | |
| 3,553,620 A | 1/1971 | Cielo et al. | |
| 3,602,795 A | 8/1971 | Gunn | |
| 3,622,868 A | 11/1971 | Todt | |
| 3,681,679 A | 8/1972 | Chung | |
| 3,708,742 A * | 1/1973 | Gunn | 363/62 |
| 3,708,744 A | 1/1973 | Stephens et al. | |
| 4,011,498 A | 3/1977 | Hamstra | |
| 4,019,122 A | 4/1977 | Ryan | |
| 4,075,547 A | 2/1978 | Wroblewski | |
| 4,202,031 A | 5/1980 | Hesler et al. | |
| 4,257,087 A | 3/1981 | Cuk | |
| 4,274,071 A | 6/1981 | Pfarre | |
| 4,327,348 A | 4/1982 | Hirayama | |
| 4,471,423 A | 9/1984 | Hase | |
| 4,499,481 A | 2/1985 | Greene | |
| 4,570,174 A | 2/1986 | Huang et al. | |
| 4,577,268 A | 3/1986 | Easter et al. | |

(Continued)

FOREIGN PATENT DOCUMENTS

| | | | |
|---|---|---|---|
| CN | 101141099 A | * | 3/2008 |
| CN | 101202509 | | 6/2008 |

(Continued)

OTHER PUBLICATIONS

Kuwabara, Kohji, et al., "Switched-Capacitor DC—DC Converters," Fujitsu Limited, IEEE, 1988, Kawasaki, Japan, pp. 213-218.

(Continued)

*Primary Examiner* — Harry Behm
(74) *Attorney, Agent, or Firm* — Boisbrun Hofman, PLLC

(57) ABSTRACT

A power converter including a charge pump employable in a power adapter. In one embodiment, the charge pump includes a voltage divider with a first diode having a terminal coupled to a terminal of a first capacitor and a second diode having a terminal coupled to a terminal of a second capacitor and another terminal coupled to another terminal of the first capacitor. The charge pump also includes a third diode coupled across the second diode and the second capacitor, and a charge pump power switch coupled across the first capacitor and the second diode.

30 Claims, 4 Drawing Sheets

(56) References Cited

U.S. PATENT DOCUMENTS

| | | |
|---|---|---|
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,770,667 A | 9/1988 | Evans et al. |
| 4,770,668 A | 9/1988 | Skoultchi et al. |
| 4,780,653 A | 10/1988 | Bezos et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Husgen |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,453,923 A | 9/1995 | Scalais et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,663,876 A | 9/1997 | Newton et al. |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svärdsjö |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,055,166 A | 4/2000 | Jacobs et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 | 5/2002 | Ng et al. |
| 6,400,579 B2 | 6/2002 | Cuk |

(56) References Cited

U.S. PATENT DOCUMENTS

| | | |
|---|---|---|
| 6,414,578 B1 | 7/2002 | Jitaru |
| 6,418,039 B2 | 7/2002 | Lentini et al. |
| 6,438,009 B2 | 8/2002 | Assow |
| 6,462,965 B1 | 10/2002 | Uesono |
| 6,466,461 B2 * | 10/2002 | Mao et al. ............... 363/21.08 |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,563,725 B2 | 5/2003 | Carsten |
| 6,570,268 B1 | 5/2003 | Perry et al. |
| 6,580,627 B2 | 6/2003 | Toshio |
| 6,597,592 B2 | 7/2003 | Carsten |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 * | 4/2005 | Jacobs et al. ............ 363/21.06 |
| 6,906,934 B2 | 6/2005 | Yang et al. |
| 6,943,553 B2 | 9/2005 | Zimmermann et al. |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Maynard et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,134,443 B2 | 3/2012 | Chandrasekaran et al. |
| 8,179,699 B2 | 5/2012 | Tumminaro et al. |
| 2001/0020886 A1 | 9/2001 | Matsumoto et al. |
| 2001/0024373 A1 | 9/2001 | Cuk |
| 2002/0057080 A1 | 5/2002 | Telefus et al. |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0167385 A1 | 11/2002 | Ackermann |
| 2003/0026115 A1 | 2/2003 | Miyazaki |
| 2003/0030422 A1 * | 2/2003 | Sula ........................... 323/288 |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |

(56) References Cited

U.S. PATENT DOCUMENTS

| | | |
|---|---|---|
| 2004/0156220 A1 | 8/2004 | Kim et al. |
| 2004/0200631 A1 | 10/2004 | Chen |
| 2004/0217794 A1* | 11/2004 | Strysko .................. 327/263 |
| 2004/0257095 A1 | 12/2004 | Yang |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2007/0007945 A1 | 1/2007 | King et al. |
| 2007/0010298 A1 | 1/2007 | Chang |
| 2007/0019356 A1 | 1/2007 | Morikawa |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu et al. |
| 2007/0296559 A1 | 12/2007 | Brar et al. |
| 2007/0298564 A1 | 12/2007 | Brar et al. |
| 2008/0024094 A1 | 1/2008 | Nishihara et al. |
| 2008/0024259 A1 | 1/2008 | Chandrasekaran et al. |
| 2008/0031021 A1 | 2/2008 | Ros et al. |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1* | 6/2008 | Beasley .................. 363/21.02 |
| 2008/0150666 A1 | 6/2008 | Chandrasekaran et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tateishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0046486 A1 | 2/2009 | Lu et al. |
| 2009/0097290 A1 | 4/2009 | Chandrasekaran |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0310388 A1 | 12/2009 | Yang |
| 2009/0315530 A1 | 12/2009 | Baranwal |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0038179 A1 | 2/2011 | Zhang |
| 2011/0089917 A1 | 4/2011 | Chen et al. |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0243271 A1 | 9/2012 | Berghegger |
| 2012/0294048 A1 | 11/2012 | Brinlee |

FOREIGN PATENT DOCUMENTS

| | | |
|---|---|---|
| CN | 201252294 | 6/2009 |
| DE | 10310361 A1 | 9/2004 |
| EP | 0 665 634 A1 | 1/1994 |
| JP | 57097361 A * | 6/1982 |
| JP | 3-215911 | 9/1991 |
| JP | 2000-68132 | 3/2000 |
| WO | WO 8700991 A * | 2/1987 |
| WO | WO 2010/083511 A1 | 7/2010 |
| WO | WO 2010/083514 A1 | 7/2010 |
| WO | WO 2010/114914 A1 | 10/2010 |
| WO | WO 2011/116225 A1 | 9/2011 |

OTHER PUBLICATIONS

Xu, Ming, et al., "Voltage Divider and its Application in the Two-stage Power Architecture," Center for Power Electronics Systems, Virginia Polytechnic Institute and State University, IEEE, 2006, Blacksburg, Virginia, pp. 499-505.
National Semiconductor Corporation, "LMC7660 Switched Capacitor Voltage Converter," www.national.com, Apr. 1997, 12 pages.
National Semiconductor Corporation, "LM2665 Switched Capacitor Voltage Converter," www.national.com, Sep. 2005, 9 pages.
Texas Instruments Incorporated, "LT1054, LT1054Y Switched-Capacitor Voltage Converters With Regulators," SLVS033C, Feb. 1990—Revised Jul. 1998, 25 pages.
Vallamkonda, Sathish, "Limitations of Switching Voltage Regulators," A Thesis in Electrical Engineering, Texas Tech University, May 2004, 89 pages.
Chhawchharia, Pradeep, et al., "On the Reduction of Component Count in Switched Capacitor DC/DC Convertors," Hong Kong Polytechnic University, IEEE, 1997, Hung Hom, Kowloon, Hong King, pp. 1395-1401.
Maxim, Application Note 725, www.maxim-ic.com/an725, Maxim Integrated Products, Nov. 29, 2001, 8 pages.
Freescale Semiconductor, "Implementing a Digital AC/DC Switched-Mode Power Supply using a 56F8300 Digital Signal Controller," Application Note AN3115, Aug. 2005, 24 pp., Chandler, AZ.
Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.
"AN100: Application Note using Lx100 Family of High Performance N-Ch JFET Transistors," AN100.Rev 1.01, Sep. 2003, 5 pp., Lovoltech, Inc., Santa Clara, CA.
"AN101A: Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Balogh, L., et al., "Power-Factor Correction with Interleaved Boost Converters in Continuous-Inductor-Current Mode," IEEE Proceedings of APEC, pp. 168-174, 1993, IEEE Los Alamitos, CA.

(56) References Cited

OTHER PUBLICATIONS

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al, "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE 11th Annual Applied Power Electronics Conference and Exposition, Mar. 1996, pp. 264-269, vol. 1, IEEE.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, P., et al., "Design and Performance Evaluation of Multi-Channel Interleaved Quasi-Square-Wave Buck Voltage Regulator Module,'"HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

(56) References Cited

OTHER PUBLICATIONS

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

Bill Andreycak, Active Clamp and Reset Technique Enhances Forward Converter Performance, Oct. 1994, Texas Instruments, 19 pages.

\* cited by examiner

POWER CONVERTER INCLUDING A CHARGE PUMP EMPLOYABLE IN A POWER ADAPTER

TECHNICAL FIELD

The present invention is directed, in general, to power electronics and, more specifically, to a power converter including a charge pump employable in a power adapter.

BACKGROUND

A switched-mode power converter (also referred to as a "power converter") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of a power switch of the power converter. The duty cycle "D" is a ratio represented by a conduction period of a power switch to a switching period thereof. Thus, if a power switch conducts for half of the switching period, the duty cycle for the power switch would be 0.5 (or 50 percent). Additionally, as the voltage or the current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

In a server or other high-end power supply applications, a microcontroller is typically used in connection with the primary side of the power train of the power converter to handle higher-level power management tasks. Most present-generation microcontrollers operate from a 3.3 volt ("V") bias voltage source, and can consume up to 100 milliamps ("mA") or more of bias current during an operation thereof. To provide a 3.3 V bias voltage source for the microcontroller, a dissipative power supply referred to as a linear regulator is typically coupled to a higher input voltage source such as a 12 V bias voltage source to produce the 3.3 V bias voltage for the microcontroller. In many power supply designs, the input voltage to the linear regulator is produced by an auxiliary power converter that provides supply voltages for housekeeping needs including both primary- and secondary-side housekeeping needs. For primary-side housekeeping needs, a 12-14 V bias voltage source is typically provided for a pulse-width modulation ("PWM") control integrated circuit ("IC") and for a driver IC to drive primary-side power switches. A linear regulator can directly reduce the 12-14 V bias voltage to the 3.3 V bias voltage. A drawback of a linear regulator, however, is its power loss, which can be as large as one watt ("W"), and is significant due to the large voltage drop produced by the linear regulator. In a high-efficiency power supply design, the power loss produced by such a linear regulator is an important loss component in view of a typical efficiency target at light load, as well as a need for careful thermal management of the linear regulator power dissipation.

In a conventional solution to convert 12-14 V down to 3.3 V, the linear regulator is replaced with a power converter such as a small dc-dc power converter to provide 3.3 V, or to provide a 5 V bias voltage followed by a low-dropout linear regulator. The dc-dc power converter typically provides high efficiency, which can be greater than 90%, but the cost and component count of the dc-dc power converter as well as the printed circuit board area that it occupies can be significant drawbacks of such a design.

Cost and efficiency compromises provided by conventional approaches to providing an auxiliary bias voltage in a power converter have become obstacles in the high-volume, competitive marketplaces now being served by such designs. Thus, despite continued size and cost reductions of components associated with power conversion, no satisfactory strategy has emerged to resolve the issues associated with providing a small, efficient, and low-cost bias voltage in a power converter for an internal housekeeping function. Accordingly, what is needed in the art is a circuit and related method to produce an internal bias voltage in a power converter that avoids the aforementioned obstacles, particularly for high-volume, low-cost manufacture of power adapters and other power supplies employing the same.

SUMMARY OF THE INVENTION

These and other problems are generally solved or circumvented, and technical advantages are generally achieved, by advantageous embodiments of the present invention, including a power converter including a charge pump employable in a power adapter. In one embodiment, the charge pump, and related method of forming and operating the same, includes a voltage divider with a first diode having a terminal coupled to a terminal of a first capacitor and a second diode having a terminal coupled to a terminal of a second capacitor and another terminal coupled to another terminal of the first capacitor. The charge pump also includes a third diode coupled across the second diode and the second capacitor, and a charge pump power switch coupled across the first capacitor and the second diode.

In another aspect, a power converter, and related method of forming and operating the same, includes a transformer including a primary winding, a secondary winding and a bias winding. The power converter also includes a power switch coupled to the primary winding, an auxiliary switch coupled to the secondary winding and a charge pump coupled to the bias winding as described herein. The power converter also includes a linear regulator coupled to the charge pump and a controller coupled to the linear regulator and the power switch. The power converter is employable in a power adaptor or other power supply as the application dictates.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The Figures are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a charge pump employable in a power converter configured to produce a voltage (e.g., a bias voltage) that is a fraction of an ac input voltage. While the principles of the present invention will be described in the environment of a power converter, any application that may benefit from a charge pump including a power amplifier or a motor controller is well within the broad scope of the present invention.

A power converter is frequently employed in electronic power conversion applications such as a power supply (e.g., power adapter) for a desktop computer or server because of its high power conversion efficiency and low cost. In higher power applications such as for servers or motor controllers, full- or half-bridge switched-mode power converters are frequently employed. In lower power applications such as for laptop computers and printers, a flyback switched-mode power converter is frequently employed.

Figure 1:
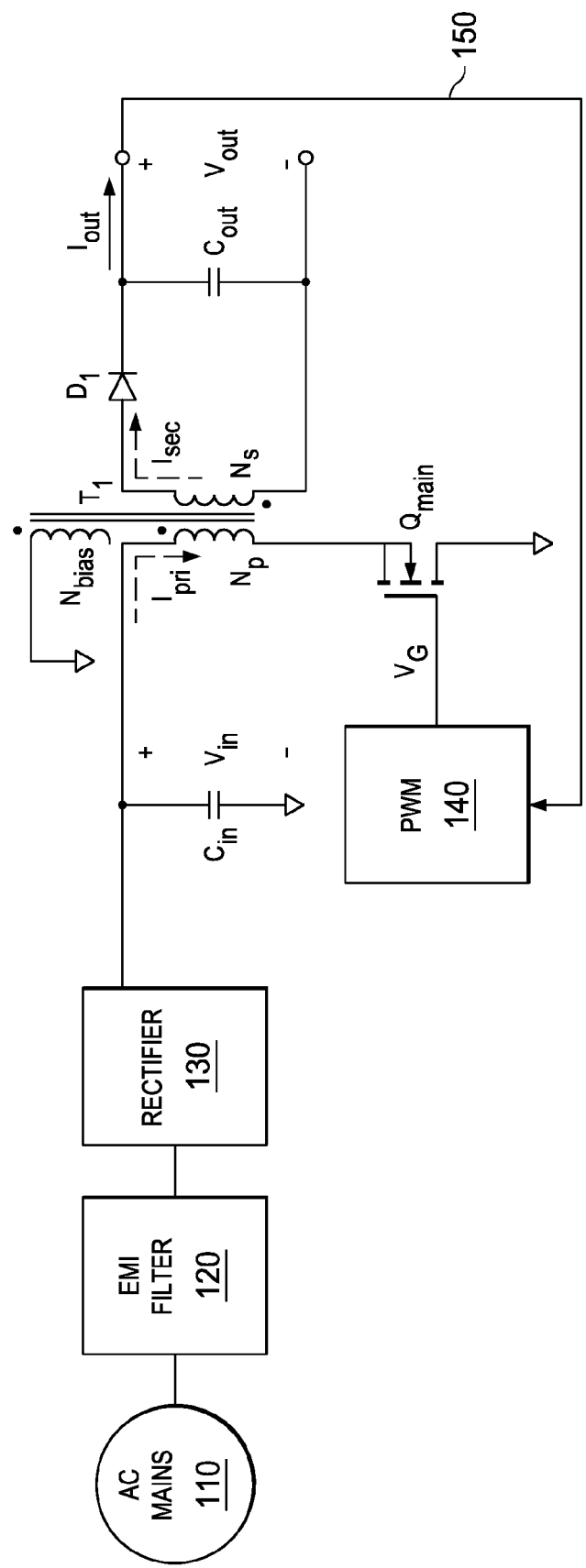
FIG. 1 illustrates a schematic diagram of an embodiment of a power adapter constructed according to the principles of the present invention.

Turning now to FIG. 1, illustrated is a schematic diagram of an embodiment of a power adapter constructed according to the principles of the present invention. A power train (e.g., a flyback power train) of the power converter (also referred to as a "flyback power converter") includes a power switch $Q_{main}$, coupled to a source of electrical power (e.g., an ac mains 110), an electromagnetic interference ("EMI") filter 120, and an input filter capacitor $C_{in}$ to provide a substantially filtered dc input voltage $V_{in}$, to a magnetic device (e.g., an isolating transformer or transformer $T_1$). Although the EMI filter 120 illustrated in FIG. 1 is positioned between the ac mains 110 and a bridge rectifier 130, the EMI filter 120 may contain filtering components positioned between the bridge rectifier 130 and the transformer $T_1$. The transformer $T_1$ has a primary winding $N_p$ and a secondary winding $N_s$ with a turns ratio that is selected to provide an output voltage $V_{out}$ with consideration of a resulting duty cycle and stress on power train components.

The power switch $Q_{main}$ (e.g., an n-channel field-effect transistor) is controlled by a controller (e.g., a pulse-width modulator ("PWM") controller 140) that controls the power switch $Q_{main}$ to be conducting for a duty cycle. The power switch $Q_{main}$ conducts in response to gate drive signal $V_G$ produced by the PWM controller 140 with a switching frequency (often designated as "$f_s$"). The duty cycle is controlled (e.g., adjusted) by the PWM controller 140 to regulate an output characteristic of the power converter such as an output voltage $V_{out}$, an output current $I_{out}$, or a combination thereof. A feedback path 150 enables the PWM controller 140 to control the duty cycle to regulate the output characteristic of the power converter. Of course, as is well known in the art, a circuit isolation element such as an opto-isolator may be employed in the feedback path 150 to maintain input-output isolation of the power converter. The ac voltage or alternating voltage appearing on the secondary winding $N_s$ of the transformer $T_1$ is rectified by an auxiliary power switch (e.g., a diode $D_1$), and the dc component of the resulting waveform is coupled to the output through the low-pass output filter including an output filter capacitor $C_{out}$ to produce the output voltage $V_{out}$. The transformer $T_1$ is also formed with a third winding (e.g., a bias winding) $N_{bias}$ that will be described later hereinbelow.

During a first portion of the duty cycle, a current $I_{pri}$ (e.g., an inductor current) flowing through the primary winding $N_p$ of the transformer $T_1$ increases as current flows from the input through the power switch $Q_{main}$. During a complementary portion of the duty cycle (generally co-existent with a complementary duty cycle 1-D of the power switch $Q_{main}$), the power switch $Q_{main}$ is transitioned to a non-conducting state. Residual magnetic energy stored in the transformer $T_1$ causes conduction of current $I_{sec}$ through the diode $D_1$ when the power switch $Q_{main}$ is off. The diode $D_1$, which is coupled to the output filter capacitor $C_{out}$, provides a path to maintain continuity of a magnetizing current of the transformer $T_1$. During the complementary portion of the duty cycle, the magnetizing current flowing through the secondary winding $N_s$ of the transformer $T_1$ decreases. In general, the duty cycle of the power switch $Q_{main}$, may be controlled (e.g., adjusted) to maintain a regulation of or regulate the output voltage $V_{out}$ of the power converter.

In order to regulate the output voltage $V_{out}$, a value or a scaled value of the output voltage $V_{out}$ is typically compared with a reference voltage in the PWM controller 140 using an error amplifier (not shown) to control the duty cycle. This forms a negative feedback arrangement to regulate the output voltage $V_{out}$ to a (scaled) value of the reference voltage. A larger duty cycle implies that the power switch $Q_{main}$ is closed for a longer fraction of the switching period of the power converter. Thus, the power converter is operable with a switching cycle wherein an input voltage $V_{in}$ is coupled to the transformer $T_1$ for a fraction of a switching period by the power switch $Q_{main}$ controlled by the PWM controller 140.

Typically, the PWM controller 140 is powered by a bias voltage (e.g., 12 volts) from an internal bias voltage source. If the PWM controller 140 includes a lower voltage-based microcontroller requiring, for instance, 3.3 volts to operate, then a dissipative power supply such as a linear regulator is typically coupled to the internal bias voltage source to produce the 3.3 V bias voltage for the microcontroller or the like. To improve the efficiency of the linear regulator, a switched-capacitor dc-dc power converter may be employed to approximately divide the voltage produced by the internal bias voltage source by an integer such as 2, 3, 4, etc. For example, a 12 V bias voltage source can be divided by a factor of about two to produce a 6 V bias voltage source by coupling the switched-capacitor dc-dc power converter to the 12 V bias voltage source.

Figure 2:
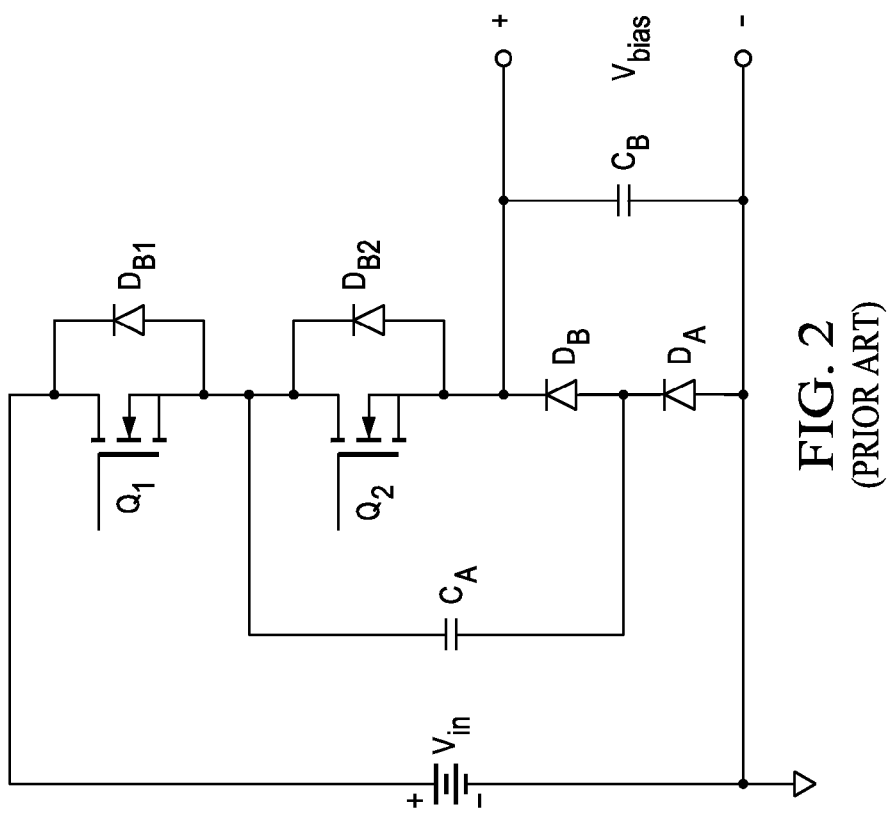
FIG. 2 illustrates a schematic diagram of a switched-mode dc-dc power converter configured to divide a dc input bias voltage source by a factor of two to produce a bias voltage.

Turning now to FIG. 2, illustrated is a schematic diagram of a switched-capacitor dc-dc power converter configured to divide a dc input bias voltage source represented by a battery $V_{in}$, by a factor of two to produce a bias voltage $V_{bias}$. The switched-capacitor dc-dc power converter illustrated in FIG. 2 employs two power switches $Q_1$, $Q_2$ (with body diodes $D_{b1}$, $D_{b2}$, respectively), two diodes $D_A$, $D_B$, a flying capacitor $C_A$ and an output capacitor $C_B$. The operation of the switched-capacitor dc-dc power converter illustrated in FIG. 2 is described by Xu, et al., in U.S. Patent Application Publication No. 2007/0296383, published Dec. 27, 2007, which is incorporated herein by reference. The switched-capacitor dc-dc power converter illustrated in FIG. 2 and variations thereof, as described by Xu, et al., can be configured to provide high power conversion density and high power conversion efficiency.

As is well known in the art, portions of the switched-capacitor dc-dc power converter illustrated in FIG. 2 may be replicated to provide a higher voltage-dividing factor, such as a voltage-dividing factor of 3, 4 or more. Replication of portions of a switched-capacitor dc-dc power converter to provide a higher voltage-dividing factor are described by P. Chhawchharia, et al., in the paper entitled "On the Reduction of Component Count in Switched Capacitor DC/DC Converters," PESC Record, Vol. 2, June 1998, pp. 1395-1401, which is incorporated herein by reference. It is recognized that a switched-capacitor dc-dc power converter does not precisely divide an input voltage by an integer, due to inherent losses in such circuits.

Figure 3:
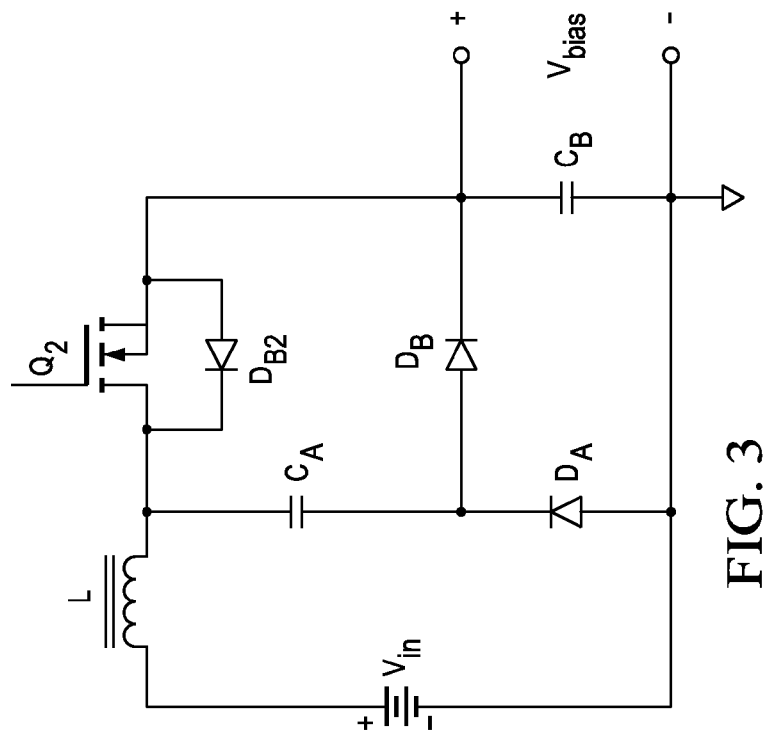
FIG. 3 illustrates a schematic diagram of a switched-mode dc-dc power converter that eliminates a need for one of the power switches illustrated in FIG. 2.

Turning now to FIG. 3, illustrated is a schematic diagram of a switched-capacitor dc-dc power converter that eliminates a need for one of the power switches illustrated in FIG. 2. The switched-capacitor dc-dc power converter illustrated in FIG. 3 is configured to divide a dc input bias voltage source represented by the battery $V_{in}$ by a factor of two to produce a bias voltage $V_{bias}$, employing one power switch $Q_2$, two diodes $D_A$, $D_B$, a flying capacitor $C_A$, and an output capacitor $C_B$. The flying capacitor $C_A$ and an output capacitor $C_B$ may be one microfarad. In place of the active switch $Q_1$ illustrated in FIG. 2, the switched-capacitor dc-dc power converter illustrated in FIG. 3 employs an inductor L. The operation of the switched-capacitor dc-dc power converter illustrated in FIG. 3 is described by Kuwabara, et al., in the paper entitled "Switched-Capacitor DC-DC Converters," published in the Proceedings of INTELEC 1988, pp. 213-218, which is incorporated herein by reference. The substitution of an inductor L for a power switch obviously saves the cost of the power switch, adds the cost of the inductor, and renders integration of the switched-capacitor dc-dc power converter into a compact module more difficult. As is well known in the art, portions of the switched-capacitor dc-dc power converter illustrated in FIG. 3 may be replicated to provide a higher voltage-dividing factor, such as a voltage-dividing factor of 3, 4 or more. As is further known in the art, a plurality of switched-capacitor dc-dc power converters may be coupled in tandem to produce a voltage-dividing factor that is a product of each of the respective switched-capacitor dc-dc power converters. The switched-capacitor dc-dc power converters illustrated in FIGS. 2 and 3 eliminate the need for a more complex topology such as a buck power converter.

A low cost, high efficiency power converter including a charge pump is introduced herein that can be employed to divide approximately an input voltage by an integer, thereby replacing a topology such as a buck power converter in cost-sensitive applications. Using the charge pump, a 12-14 V voltage source can be efficiently divided down to 6-7 V, and then fed to a linear regulator (e.g., a low-dropout linear regulator) to obtain a desired low voltage bias voltage source such as a 3.3 V bias voltage source for the microcontroller associated with a PWM controller. The power loss can be reduced by approximately one half compared to using a linear regulator with a higher input voltage with its lower efficiency. Thermal design issues are correspondingly reduced.

In a typical application, an auxiliary winding (e.g., a bias winding) and associated pins would be added to a high-frequency transformer in a power converter to generate an ac voltage or alternating voltage such as a 12 V rectangular waveform. The charge pump can be advantageously constructed with minimal cost with only a few small components. The charge pump basically modifies (e.g., divides) the alternating voltage from the bias winding in half by charging and discharging a "flying" capacitor. It provides high efficiency and low cost with little added space.

Figure 4:
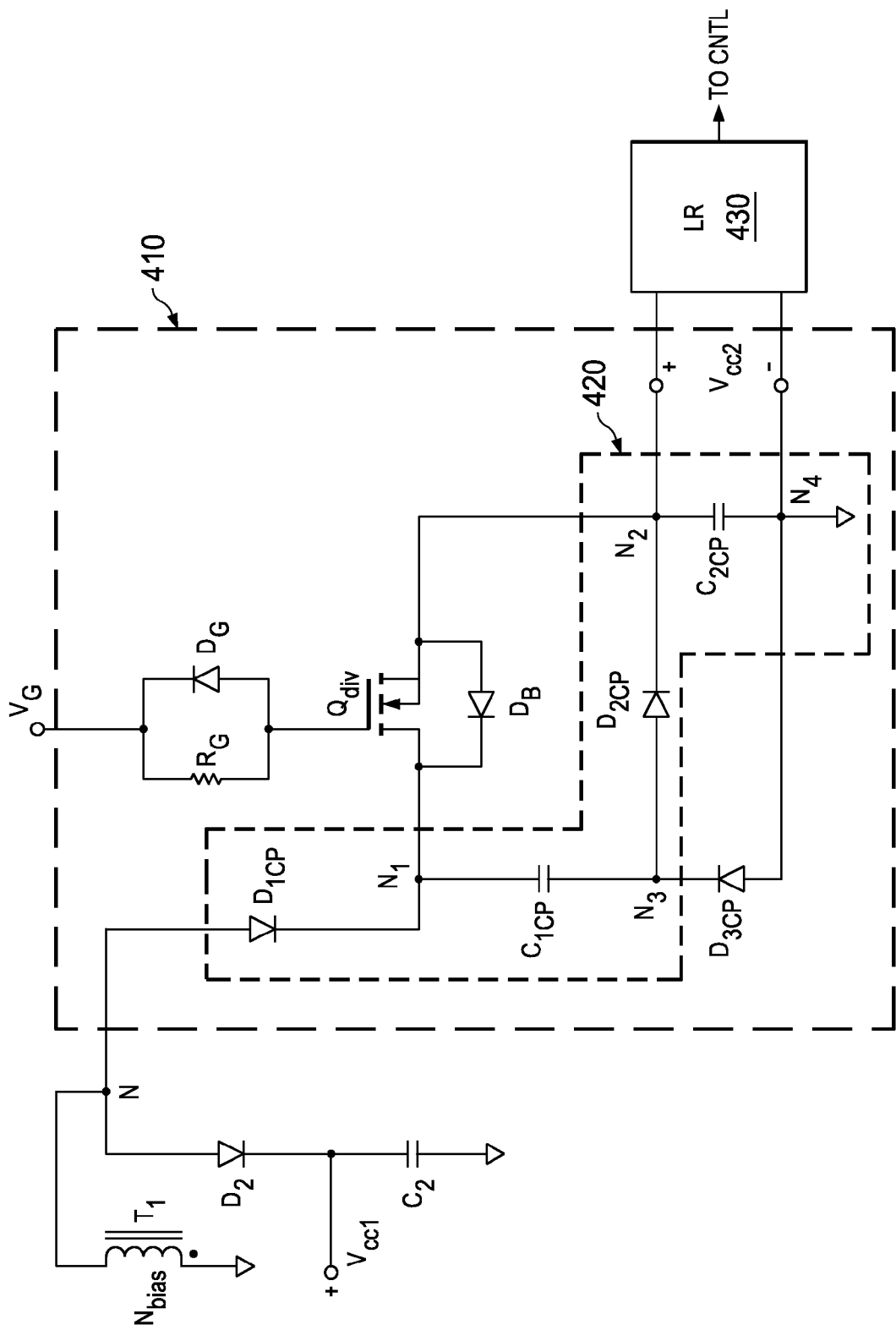
FIGS. 4 and 5 illustrate schematic diagrams of embodiments of a charge pump employable in a power converter constructed according to the principles of the present invention.

Turning now to FIG. 4, illustrated is a schematic diagram of an embodiment of a charge pump 410 employable in a power converter constructed according to the principles of the present invention. The charge pump 410 is coupled to an ac voltage source at a circuit node N provided by the bias winding $N_{bias}$ of the transformer $T_1$ that was illustrated and described with reference to FIG. 1. FIG. 4 illustrates a primary-side bias voltage source $V_{cc1}$ produced by a diode $D_2$ and a filter capacitor $C_2$ (e.g., 47 microfarads) coupled to the ac voltage source at the circuit node N. In the embodiment of the charge pump presently being described, the ac voltage source at the circuit node N provides an alternating positive and negative 12 V rectangular waveform at 100 kilohertz ("kHz"). The charge pump 410 includes a voltage divider 420 formed with a first diode $D_{1CP}$), a first capacitor $C_{1CP}$ (e.g., a one microfarad), a second diode $D_{2CP}$ and a second capacitor $C_{2CP}$(e.g., one microfarad). The first diode $D_{1CP}$ is series-coupled to the first capacitor $C_{1CP}$ at a first node N1, and the second diode $D_{2CP}$ is series-coupled to the second capacitor $C_{2CP}$ at a second node N2 and coupled to the first capacitor $C_{1CP}$ at a third node N3.

When the voltage at the circuit node N is a positive 12 V, the first diode $D_{1CP}$ conducts, charging the first capacitor $C_{1CP}$ and the second capacitor $C_{2CP}$ through the second diode $D_{2CP}$. Note that the first and second diodes $D_{1CP}$, $D_{2CP}$ are poled in the same direction. In other words, the first and second diodes $D_{1CP}$, $D_{2CP}$ are poled so that a current can be conducted therethrough when a positive voltage is present at the circuit node N. The first and second capacitors $C_{1CP}$, $C_{2CP}$ have substantially equal capacitance. Accordingly, each of the first and second capacitors $C_{1CP}$, $C_{2CP}$ is charged to roughly half the 12 V input less the forward voltage drops of the first and second diodes $D_{1CP}$, $D_{2CP}$. Recognizing the small forward voltage drop in the first and second diodes $D_{1CP}$, $D_{2CP}$, the voltage applied at the circuit node N is thus divided approximately in half across each of the first and second capacitors $C_{1CP}$, $C_{2CP}$.

When the voltage at the circuit node N is a positive 12 V, a charge pump power switch or power switch $Q_{div}$ (coupled between the first and second nodes N1, N2) is turned off by a gate drive signal $V_G$ that was illustrated and described hereinabove with reference to FIG. 1. The diode $D_B$ illustrated FIG. 4 is the body diode of the power switch $Q_{div}$. When the voltage at the circuit node N is a negative 12 V, the power switch $Q_{div}$ is turned on by the gate drive signal $V_G$, coupling the first and second capacitors $C_{1CP}$, $C_{2CP}$ in parallel. This switching action substantially balances the charges in the first and second capacitors $C_{1CP}$, $C_{2CP}$, recognizing the small disparity in charge produced by the forward voltage drop presented by a third diode $D_{3CP}$. The power switch is $Q_{div}$ is enabled to conduct in synchronization with an alternating voltage applied to the voltage divider 420 via the bias winding $N_{bias}$ of the transformer $T_1$ of the power converter. The third diode $D_{3CP}$ is coupled between the third node N3 and a fourth node N4 coupled to the second capacitor $C_{2CP}$ Accordingly, a bias voltage source $V_{cc2}$ is produced that is slightly less than half the 12 V amplitude of the rectangular ac waveform at the circuit node N. A parallel-coupled resistor $R_G$ (e.g., a 22 ohm) and diode $D_G$ are included in series with a control terminal of the power switch $Q_{div}$ to retard turn-on timing of the power switch $Q_{div}$ in response to the gate drive signal $V_G$, but not its turn-off timing.

Additionally, the bias voltage source $V_{cc2}$ produced by the charge pump 410 is fed to a linear regulator 430 to obtain a desired low voltage bias voltage source such as a 3.3 V bias voltage source for a microcontroller or the like associated with a controller such as a PWM controller (designated "To CNTL"). The linear regulator 430, therefore, modifies the bias voltage $V_{cc2}$ for use by the controller of a power converter. The power loss can be reduced by approximately one half compared to using a linear regulator with a higher input voltage with its lower efficiency. Thermal design issues are correspondingly reduced.

The charge pump illustrated in FIG. 4 can be readily modified to operate with a forward or other power train topology by changing the power switch $Q_{div}$ to a P-channel metal-oxide semiconductor field-effect transistor ("MOSFET") or to a positive-negative-positive ("PNP") doped bipolar junction transistor, or by reversing the polarity sense of the bias winding $N_{bias}$ as necessary with respect to timing of the gate drive signal $V_G$. The charge pump 410 illustrated in FIG. 4 can also be readily modified by replicating portions thereof to provide a higher voltage-dividing ratio (see, e.g., the charge pump illustrated and described with respect to FIG. 5).

Figure 5:
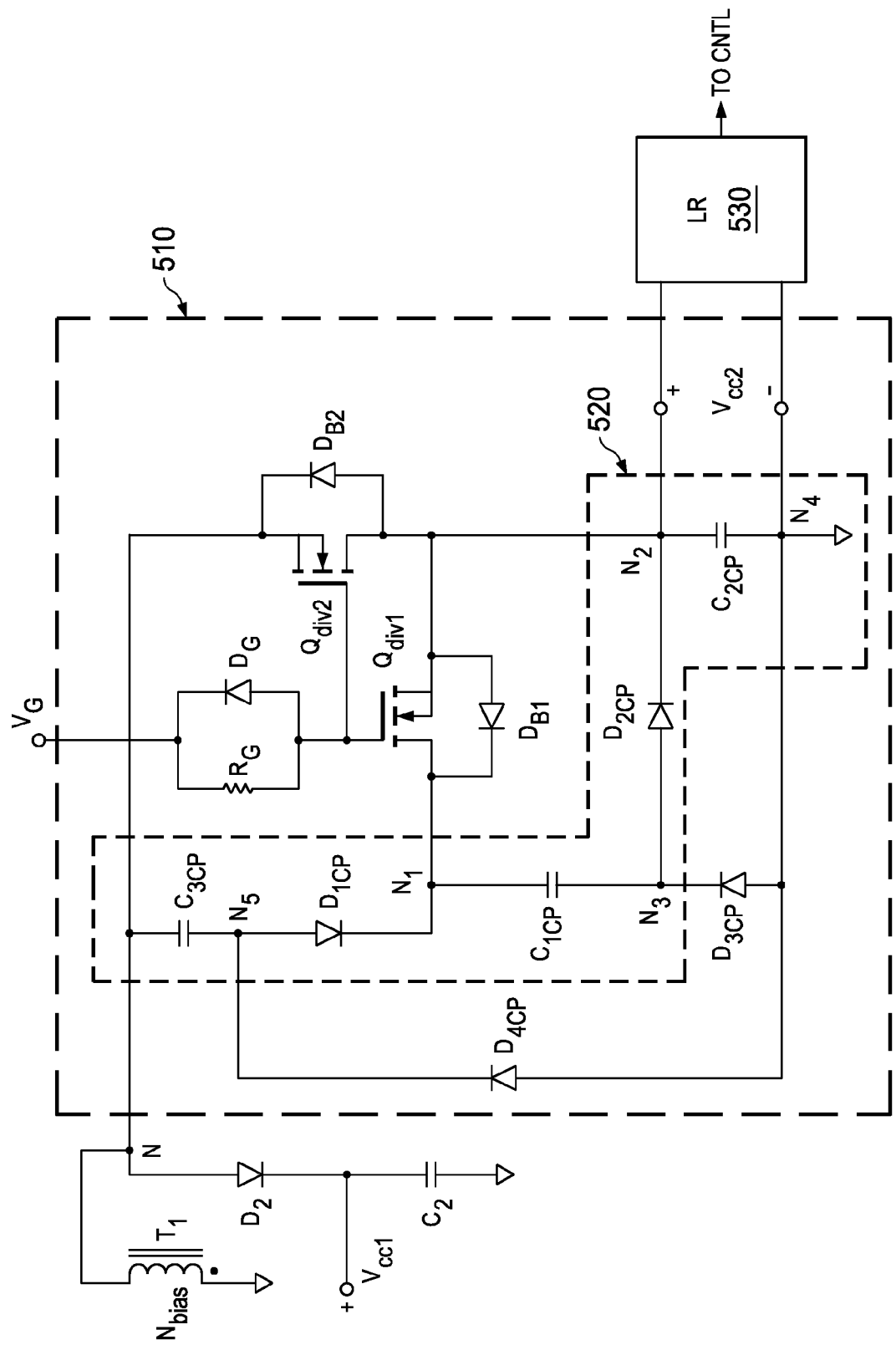

Turning now to FIG. 5, illustrated is a schematic diagram of another embodiment of a charge pump 510 employable in a power converter constructed according to the principles of the present invention. The charge pump 510 is coupled to an ac voltage source at a circuit node N provided by the bias winding $N_{bias}$ of the transformer $T_1$ that was illustrated and described with reference to FIG. 1. As described previously hereinabove with reference to FIG. 4, FIG. 5 illustrates a primary-side bias voltage source $V_{cc1}$ produced by a diode $D_2$ and a filter capacitor $C_2$ (e.g., 47 microfarads) coupled to the ac voltage source at the circuit node N. In the embodiment of the charge pump 510 presently being described, the ac voltage source at the circuit node N again provides an alternating positive and negative 12 V rectangular waveform at 100 kilohertz ("kHz").

The charge pump 510 illustrated in FIG. 5 includes a voltage divider 520 formed with a first diode $D_{1CP}$, a first capacitor $C_{1CP}$ (e.g., a one microfarad), a second diode $D_{2CP}$, a second capacitor $C_{2CP}$ (e.g., one microfarad), and a third capacitor $C_{3CP}$ (e.g., a one microfarad). The first diode $D_{1CP}$ is series-coupled to the first capacitor $C_{1CP}$ at a first node N1, and the second diode $D_{2CP}$ is series-coupled to the second capacitor $C_{2CP}$ at a second node N2 and coupled to the first capacitor $C_{1CP}$ at a third node N3. The second capacitor $C_{2CP}$ is coupled between the second node N2 and a fourth node N4.

The third capacitor $C_{3CP}$ is coupled to the first diode $D_{1CP}$ at a fifth node N5 and to the circuit node N.

When the voltage at the circuit node N is a positive 12 V, the first diode $D_{1CP}$ conducts, charging the first capacitor $C_{1CP}$, the second capacitor $C_{2CP}$, and the third capacitor $C_{3CP}$ through the second diode $D_{2CP}$. Note that the first and second diodes $D_{1CP}$, $D_{2CP}$ are poled in the same direction. In other words, the first and second diodes $D_{1CP}$, $D_{2CP}$ are poled so that a current can be conducted therethrough when a positive voltage is present at the circuit node N. The first, second, and third capacitors $C_{1CP}$, $C_{2CP}$, $C_{3CP}$ have substantially equal capacitance. Accordingly, each of the first, second, and third capacitors $C_{1CP}$, $C_{2CP}$, $C_{3CP}$ is charged to roughly one third the 12 V input less the forward voltage drops of the first and second diodes $D_{1CP}$, $D_{2CP}$. Recognizing the small forward voltage drop in the first and second diodes $D_{1CP}$, $D_{2CP}$, the voltage applied at the circuit node N is thus divided approximately in one third across each of the first, second, and third capacitors $C_{1CP}$, $C_{2CP}$, $C_{3CP}$.

When the voltage at the circuit node N is a positive 12 V, a first charge pump power switch or first power switch $Q_{div1}$ (coupled between the first and second nodes N1, N2) and a second charge pump power switch or second power switch $Q_{div2}$ (coupled between the node N and the second node N2) are turned off by the gate drive signal $V_G$ that was illustrated and described hereinabove with reference to FIG. 1. The diode $D_{B1}$ illustrated FIG. 5 is the body diode of the first power switch $Q_{div1}$, and the diode $D_{B2}$ illustrated FIG. 5 is the body diode of the second power switch $Q_{div2}$. When the voltage at the circuit node N is a negative 12 V, the first and second power switches $Q_{div1}$, $Q_{div2}$ are turned on by the gate drive signal $V_G$, coupling the first, second, and third capacitors $C_{1CP}$, $C_{2CP}$, $C_{3CP}$ in parallel. This switching action substantially balances the charges in the first, second, and third capacitors $C_{1CP}$, $C_{2CP}$, $C_{3CP}$, recognizing the small disparity in charge produced by the forward voltage drop presented by third and fourth diodes $D_{3CP}$, $D_{4CP}$. The first and second power switches $Q_{div1}$, $Q_{div2}$ are enabled to conduct in synchronization with an alternating voltage applied to the voltage divider 520 via the bias winding $N_{bias}$ of the transformer $T_1$ of the power converter. The third diode $D_{3CP}$ is coupled between the third and fourth nodes N3, N4 and the fourth diode $D_{4CP}$ is coupled between the fourth and fifth nodes N4, N5. Accordingly, a bias voltage $V_{cc2}$ is produced that is slightly less than one third the 12 V amplitude of the rectangular ac waveform at the circuit node N. A parallel-coupled resistor $R_G$ (e.g., a 22 ohm resistor) and diode $D_G$ are included in series with a control terminals of the first and second power switches $Q_{div1}$, $Q_{div2}$ to retard turn-on timing of the first and second power switches $Q_{div1}$, $Q_{div2}$ in response to the gate drive signal $V_G$, but not their turn-off timing.

Additionally, the bias voltage $V_{cc2}$ produced by the charge pump 510 may be fed to the linear regulator 530 to obtain a desired low voltage bias voltage source for a microcontroller or the like associated with a controller such as a PWM controller (again designated "To CNTL"). The linear regulator 530, therefore, modifies the bias voltage $V_{cc2}$ for use by the controller of a power converter. The power loss can be substantially reduced compared to using a linear regulator with a higher input voltage with its lower efficiency. Thermal design issues are correspondingly reduced.

The charge pump 510 illustrated in FIG. 5 can be correspondingly readily modified to operate with a forward or other power train topology by changing the first and second power switches $Q_{div1}$, $Q_{div2}$ to P-channel MOSFETs or to positive-negative-positive ("PNP") doped bipolar junction transistors, and by reversing the polarity sense of the bias winding $N_{bias}$ as necessary with respect to timing of the gate drive signal $V_G$. While the charge pump 510 illustrated in FIG. 5 divides the voltage applied at the circuit node N approximately in one third, the charge pump 510 can also be readily modified by replicating portions thereof to provide a still higher voltage-dividing ratio.

Thus, a charge pump employable in a power converter has been introduced that can be advantageously constructed with a plurality of diodes, a power switch and a plurality of capacitors (e.g., a flying capacitor and another capacitor). The charge pump can be constructed without the need to add an inductor to replace a power switch required in a conventional switched-capacitor dc-dc power converter design. In one embodiment, the charge pump, and related method of forming and operating the same, includes a voltage divider (couplable to a bias winding of a transformer of a power converter) with a first diode having a terminal (e.g., a cathode terminal) coupled to a terminal of a first capacitor. The first diode is series-coupled to the first capacitor. The voltage divider also includes a second diode having a terminal (e.g., a cathode terminal) coupled to a terminal of a second capacitor and another terminal (e.g., an anode terminal) coupled to another terminal of the first capacitor. The second diode is series-coupled to the second capacitor. Also, the first diode and the second diode are poled in a same direction.

The charge pump also includes a third diode coupled across the second diode and the second capacitor. The third diode has a terminal (e.g., a cathode terminal) coupled to the another terminal (e.g., the anode terminal) of the second diode and another terminal (e.g., an anode terminal) coupled to another terminal of the second capacitor. The charge pump also includes a charge pump power switch coupled across the first capacitor and the second diode. The charge pump power switch is coupled to the terminal of the first capacitor and the terminal of the second capacitor. The charge pump power switch is enabled to conduct in synchronization with an alternating voltage applied to the voltage divider. The charge pump may include a fourth diode and another charge pump power switch and the voltage divider may include a third capacitor. Additionally, a control terminal of the charge pump power switch is coupled to a parallel-coupled resistor and diode.

In another embodiment, a power converter, and related method of forming the same, includes a transformer including a primary winding, a secondary winding and a bias winding. The power converter also includes a power switch coupled to the primary winding, an auxiliary switch (e.g., a diode) coupled to the secondary winding and a charge pump coupled to the bias winding as described herein. The power converter also includes a linear regulator coupled to the charge pump and a controller (e.g., a PWM controller) coupled to the linear regulator and the power switch. The power converter is employable in a power adaptor or other power supply as the application dictates.

In a related embodiment, a method of operating a power converter includes providing a transformer including a primary winding, a secondary winding and a bias winding. The method also includes impressing a voltage across the primary winding from a source of electrical power, rectifying an alternating voltage appearing on the secondary winding, and producing a bias voltage from an alternating voltage appearing on the bias winding with a charge pump as described herein. The method also includes modifying the bias voltage (e.g., with a linear regulator) for use by a controller (e.g., a PWM controller) of the power converter.

Those skilled in the art should understand that the previously described embodiments of a switched-capacitor power converter and related methods of operating the same are submitted for illustrative purposes only. For example, in a further embodiment, a switched-capacitor power converter that is coupled to a half-wave bridge instead of a flyback power train can use techniques described herein. While a switched-capacitor power converter has been described in the environment of a power converter for a microcontroller, these processes may also be applied to other systems such as, without limitation, a power amplifier or a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A charge pump, comprising:
 a voltage divider, including:
  a first diode having a terminal coupled to a terminal of a first capacitor, and
  a second diode having a terminal coupled to a terminal of a second capacitor and another terminal coupled to another terminal of said first capacitor;
 a third diode coupled across said second diode and said second capacitor;
 a power switch coupled across said first capacitor and said second diode; and
 a parallel-coupled resistor and diode coupled to a control terminal of said power switch and configured to retard a turn-on timing of said power switch in response to a drive signal for another power switch.

2. The charge pump as recited in claim 1 wherein said terminal of said first diode is a cathode terminal.

3. The charge pump as recited in claim 1 wherein said terminal of said second diode is a cathode terminal and said another terminal of said second diode is an anode terminal.

4. The charge pump as recited in claim 1 wherein said third diode has a terminal coupled to said another terminal of said second diode and another terminal coupled to another terminal of said second capacitor.

5. The charge pump as recited in claim 4 wherein said terminal of said third diode is a cathode terminal and said another terminal of said third diode is an anode terminal.

6. The charge pump as recited in claim 1 wherein said power switch is coupled to said terminal of said first capacitor and said terminal of said second capacitor.

7. The charge pump as recited in claim 1 wherein said first diode is series-coupled to said first capacitor and said second diode is series-coupled to said second capacitor.

8. The charge pump as recited in claim 1 wherein said first diode and said second diode are poled in a same direction.

9. The charge pump as recited in claim 1 wherein said power switch is enabled to conduct in synchronization with an alternating voltage applied to said voltage divider.

10. The charge pump as recited in claim 1 wherein said voltage divider includes a third capacitor and said charge pump comprises a fourth diode and another power switch.

11. A method of forming a charge pump, comprising:
    providing a voltage divider, including:
        coupling a terminal of a first diode to a terminal of a first capacitor,
        coupling a terminal of a second diode to a terminal of a second capacitor, and
        coupling another terminal of said second diode to another terminal of said first capacitor;
    coupling a third diode across said second diode and said second capacitor;
    coupling a power switch across said first capacitor and said second diode; and
    coupling a parallel-coupled resistor and diode to a control terminal of said power switch configured to retard a turn-on timing of said power switch in response to a drive signal for another power switch.

12. The method as recited in claim 11 wherein said terminal of said first diode is a cathode terminal, said terminal of said second diode is a cathode terminal and said another terminal of said second diode is an anode terminal.

13. The method as recited in claim 11 wherein said coupling said third diode comprises coupling a terminal of said third diode to said another terminal of said second diode and coupling another terminal of said third diode to another terminal of said second capacitor.

14. The method as recited in claim 11 wherein said first diode is series-coupled to said first capacitor and said second diode is series-coupled to said second capacitor, said first diode and said second diode being poled in a same direction.

15. The method as recited in claim 11 wherein said providing further includes coupling a third capacitor to said terminal of said first capacitor and said method further comprises coupling another power switch to said power switch and coupling a fourth diode to said terminal of said first capacitor.

16. A power converter, comprising:
    a transformer including a primary winding, a secondary winding and a bias winding;
    a power switch coupled to said primary winding;
    an auxiliary switch coupled to said secondary winding; and
    a charge pump coupled to said bias winding, comprising:
        a voltage divider, including:
            a first diode having a terminal coupled to a terminal of a first capacitor, and
            a second diode having a terminal coupled to a terminal of a second capacitor and another terminal coupled to another terminal of said first capacitor;
        a third diode coupled across said second diode and said second capacitor;
        a charge pump power switch coupled across said first capacitor and said second diode; and
        a parallel-coupled resistor and diode coupled to a control terminal of said charge pump power switch and configured to retard a turn-on timing of said charge pump power switch in response to a drive signal for said power switch.

17. The power converter as recited in claim 16, further comprising:
    a linear regulator coupled to said second capacitor; and
    a controller coupled to said linear regulator and said power switch.

18. The power converter as recited in claim 16 wherein said auxiliary switch is a diode.

19. The power converter as recited in claim 16 wherein another terminal of said first diode is coupled to said bias winding.

20. The power converter as recited in claim 16 wherein said terminal of said first diode is a cathode terminal, said terminal of said second diode is a cathode terminal and said another terminal of said second diode is an anode terminal.

21. The power converter as recited in claim 16 wherein said third diode has a terminal coupled to said another terminal of said second diode and another terminal coupled to another terminal of said second capacitor.

22. The power converter as recited in claim 16 wherein said charge pump power switch is coupled to said terminal of said first capacitor and said terminal of said second capacitor.

23. The power converter as recited in claim 16 wherein said first diode is series-coupled to said first capacitor and said second diode is series-coupled to said second capacitor.

24. The power converter as recited in claim 16 wherein said first diode and said second diode are poled in a same direction.

25. The power converter as recited in claim 16 wherein said voltage divider includes a third capacitor and said charge pump includes a fourth diode and another charge pump power switch.

26. A method of operating a power converter, comprising:
    providing a transformer including a primary winding, a secondary winding and a bias winding;
    impressing a voltage across said primary winding from a source of electrical power;
    rectifying an alternating voltage appearing on said secondary winding; and
    producing a bias voltage from an alternating voltage appearing on said bias winding with a charge pump, comprising:
        a voltage divider, including:
            a first diode having a terminal coupled to a terminal of a first capacitor, and
            a second diode having a terminal coupled to a terminal of a second capacitor and another terminal coupled to another terminal of said first capacitor;
        a third diode coupled across said second diode and said second capacitor;
        a charge pump power switch coupled across said first capacitor and said second diode; and
        a parallel-coupled resistor and diode coupled to a control terminal of said charge pump power switch and configured to retard a turn-on timing of said charge pump power switch in response to a drive signal for another power switch.

27. The method as recited in claim 26 further comprising modifying said bias voltage for use by a controller of said power converter.

28. The method as recited in claim 26 wherein another terminal of said first diode is coupled to said bias winding.

29. The method as recited in claim 26 wherein said charge pump power switch is enabled to conduct in synchronization with said alternating voltage.

30. The method as recited in claim 26 wherein said voltage divider includes a third capacitor and said charge pump includes a fourth diode and another charge pump power switch.

* * * * *